United States Patent
Sperry et al.

(10) Patent No.: US 7,162,630 B2
(45) Date of Patent: Jan. 9, 2007

(54) SYSTEMS AND METHODS FOR IMPLEMENTING HOST-BASED SECURITY IN A COMPUTER NETWORK

(75) Inventors: Todd Sperry, Pleasanton, CA (US); Sivakumar Munnangi, Santa Clara, CA (US); Shridhar Mukund, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 676 days.

(21) Appl. No.: 10/233,303

(22) Filed: Aug. 30, 2002

(65) Prior Publication Data

US 2003/0061505 A1 Mar. 27, 2003

Related U.S. Application Data

(60) Provisional application No. 60/316,651, filed on Aug. 31, 2001.

(51) Int. Cl.
*H04L 9/00* (2006.01)
*H04L 9/32* (2006.01)

(52) U.S. Cl. .................. 713/153; 726/3; 713/160; 713/162

(58) Field of Classification Search ............. 713/201, 713/162, 160, 153; 709/230, 227
See application file for complete search history.

(56) References Cited

U.S. PATENT DOCUMENTS 5,896,499 A * 4/1999 McKelvey .............. 713/201
6,141,705 A * 10/2000 Anand et al. ............ 710/15
2002/0172174 A1* 11/2002 Dick et al. .............. 370/338
2003/0069973 A1* 4/2003 Ganesan et al. .......... 709/226
2003/0126233 A1* 7/2003 Bryers et al. ............ 709/219

OTHER PUBLICATIONS

International Search Report in International appl. No. PCT/US02/27706 mailed Nov. 22, 2002 (4 pages).
International Search Report in International appl. No. PCT/US02/27706 mailed Nov. 22, 2002.
PCT Written Opinion for International appl. No. PCT/US02/27706 mailed May 29, 2003.
PCT International Preliminary Examination Report for International appl. No. PCT/US02/27706 mailed Aug. 28, 2003.

* cited by examiner

*Primary Examiner*—Kambiz Zand
(74) *Attorney, Agent, or Firm*—IP Strategy Group PC (57) ABSTRACT

An architecture for implementing host-based security such that data security may be applied whenever the confidential data leaves a host computer or a networked device. The improved method and architecture may be implemented in a single integrated circuit for speed, power consumption, and space-utilization reasons. Within the integrated circuit, a combination of hardware-implemented, network processor-implemented, and software-implemented functions may be provided. The innovative host-based security architecture may offer line-rate IPSec acceleration, TCP acceleration, or both.

14 Claims, 6 Drawing Sheets

SYSTEMS AND METHODS FOR IMPLEMENTING HOST-BASED SECURITY IN A COMPUTER NETWORK

This application claims priority under 35 USC 119(e) of the following patent application(s), which is incorporated by reference herein (A/N 60/316,651, filed Aug. 31, 2001).

BACKGROUND OF THE INVENTION

The present invention relates to apparatus and methods for implementing security in data communication. More particularly, the present invention relates to apparatus and methods for implementing host-based security in data communication applications.

With the rise of data networking in general and the Internet in particular, businesses and organizations have become increasingly dependent on computer networks for their communications needs. Nowadays, it is not uncommon for vast quantities of data, often critical or confidential data, to be sent from computer to computer across private and public networks.

As users become increasingly dependent on computer networks for their data communication and data storage needs, network administrators are becoming increasingly concerned about data security. When a data packet is transmitted from one computer to another computer, that data packet may traverse both the private network(s) and the pubic network (such as the Internet). At every hop in the network, the data packet is handled by a network node (such as a router, a switch, a bridge, gateway, or the like) in order to pass that data packet on to the appropriate next hop toward its destination. Since the public network nodes, as well as the public network communication media (such as optical, wired, or wireless) that interconnect the public network nodes, are typically not under the control of any one entity, it has long been recognized that there are inherent security risks whenever data traverses the public network. Accordingly, data security in public networks has long been the focus of study and development.

Figure 1:
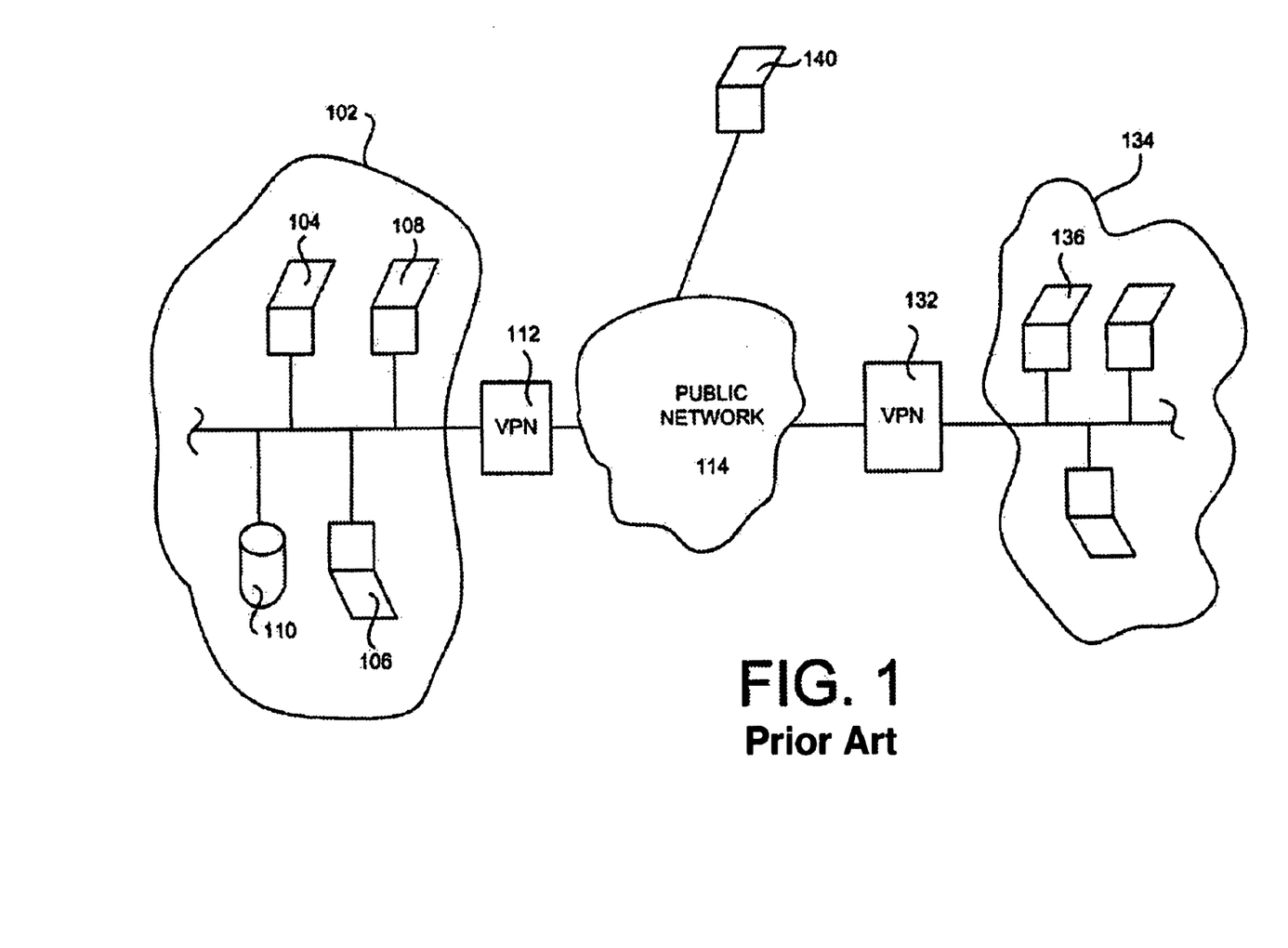
FIG. 1 illustrates a data communication arrangement for ensuring data security when data traverses across public networks.

To facilitate discussion, FIG. 1 shows a data communication arrangement for ensuring data security when data traverses across public networks. The security arrangement shown in FIG. 1 is known as perimeter security or network-edge security because security is applied to the data at the perimeter or the edge of private networks to ensure that when data leaves the private network and enters the public network, that data is secure against unauthorized access and/or tampering.

Referring now to FIG. 1, there is shown a private network 102, representing for example the intranet of an exemplary organization. Private network 102 includes a plurality of computers 104, 106, and 108, representing for example the computers and workstations in a local area network or a virtual private network. Private network 102 also includes a server 110, representing for example a mail server or a data storage facility. To allow computers 104, 106, and 108 to access facilities in other networks as well as to allow remote computers to access the facilities of private network 102, there is shown a virtual private network (VPN) gateway 112 coupled to private network 102.

To implement perimeter security, security capabilities are provided at the VPN gateways. For example, data communication from private network 102 are authenticated and/or encrypted at VPN gateway 112 prior to being sent out to a public network 114. A similar VPN gateway 132 is shown coupled between another private network 134 and pubic network 114 to encrypt data transmitted from one of the computers associated with private network 134, such as a computer 136. If computer 136 in private network 134 wishes to communicate with computer 104 in private network 102, for example, the data flow between computer 136 and 104 is authenticated by VPNs 112 and 132. If authentication is successful, data packets from computer 136 are encrypted by VPN gateway 132 associated with private network 134 and remains encrypted as they traverse public network 114 until they are decrypted by VPN gateway 112 associated with private 102 prior to being sent to computer 104. Encryption/decryption also happens analogously for data packets sent from computer 104 to computer 136. Thus, the data communication between gateway 132 and gateway 134 across public network 114 is secure.

FIG. 1 also shows a remote computer 140, representing for example a laptop computer of a traveling corporate employee. Remote computer 140 is typically provided with its own VPN gateway functionalities, including authentication and/or encryption/decryption capabilities. In the typical case, remote access from remote computer 140 to facilities within private network 140 is accomplished via a relatively slow connection, such as a dial-up connection at about 56 Kbps, a DSL (digital subscriber line) connection at about 1 Mbits/sec or slower, or a cable modem connection at analogous speeds. Because high data communication speed is not an issue, the VPN gateway functions may be implemented via a variety of conventional ways, using hardware, software, or a combination of both within remote computer 140.

In some implementations, certain strategic servers within a private network may be provided with security capabilities as well. For example, the mail server 110 within private network 102 may be provided with authentication and/or encryption/decryption capabilities to ensure that data communication to and from mail server 110 is properly encrypted and authenticated.

It has been learned over time that perimeter-based security arrangements have failed to address one serious source of security threats. For example, it has been learned over time that a significant percentage of security breaches detected in a given corporate network may be traceable to users within the corporate private network itself. In other words, even if the data communication never leaves the private network, there is still a significant risk that data security may be compromised as data is sent from one computer within a private network to another computer within that same private network or even as data is stored in one of the computers or servers connected to the private network. This form of security risk, i.e., security risks from internal users of the private network, is not addressed by perimeter-based security arrangements since perimeter-based security arrangements only address data security transmitted beyond the network perimeter. Within the network perimeter, such as within private network 102 for example, data communication between computer 102 and computer 104 is essentially unprotected in a perimeter-based security scheme.

The implementation of data security within private networks is further complicated by technical challenges associated with high data speeds. Users within corporate networks and private networks have been conditioned to expect high speed data communication. For example, in a class of applications known as block storage, data storage is centralized in a server on the network, and individual users' computers would employ a block storage protocol, such as iSCSI (essentially SCSI over TCP), in order to access stored data in the network whenever they are connected to the network. Centralized data storage offers many advantages to an organization, among which are centralized control and management over the data, improved data security since there are fewer storage locations to defend, the ability to archive and perform archival/purging functions dependably, and the like. Obviously, this class of application requires, in addition to a secure connection, a very low latency, high bandwidth connection between the user's computer and the network data storage facility. This is because users have been conditioned to expect that data access occurs with almost no delay, as the case has always been when data storage is local on their own computer's hard drive. If the connection between the user's computer and the network data storage facility is slow, centralized data storage will not succeed as users will simply revert to the less painful method of storing data, even critical, sensitive data, on their own hard drives.

On the other hand, security implementations, due to their intensive mathematical nature and multitudes of security rules, tend to worsen the data communication delay. For this reason, there has not been a technically satisfactory and economical solution to data security that addresses the internal security risks as well as satisfies the high data speed requirement within private networks, particularly for bandwidth and latency-sensitive applications such as block storage.

SUMMARY OF THE INVENTION

The invention relates, in one embodiment, to an architecture for implementing host-based security such that data security may be applied whenever the confidential data leaves a host computer or a networked device. Furthermore and in accordance with one embodiment of the present invention, there is provided a method and an architecture for offloading the TCP acceleration tasks, for example those related to block storage using the iSCSI protocol, and/or for offloading host-based security-related tasks.

In one embodiment, the improved method and architecture is implemented in a single integrated circuit for speed, power consumption, and space-utilization reasons. To offer both speed and flexibility, a combination of hardware-implemented, network processor-implemented, and software-implemented functions may be provided. In one embodiment, certain parameters associated with security association implementations are intelligently bounded to facilitate the implementation of economical, wire-speed security at high data communication speeds (such as 1 Gbits/second and above).

In one embodiment, the innovative host-based security architecture involves a single integrated circuit capable of offering line-rate IPSec acceleration, TCP acceleration, or both. Since it is recognized that the target environment wherein the security processing is implemented may have more than one form, the IKE function may be made modular and may be implemented in the host system, the IPSec/TCP offloading IC itself, and/or in the Embedded Processor portion of the IPSec/TCP offloading IC.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

It is the view of the inventors herein that to fully ensure data security for communication of confidential data inside and outside of a private network, data security must be applied whenever the confidential data leaves a host computer or a networked device. To put it differently, the confidential data must be secure not only when it leaves the perimeter of the private network as in the case with the perimeter security scheme, but must also be secure within the private network as well. Such a data security arrangement, known as host-based data security, calls for the provision of security capabilities at each host in the network that may send or receive confidential data.

Figure 2:
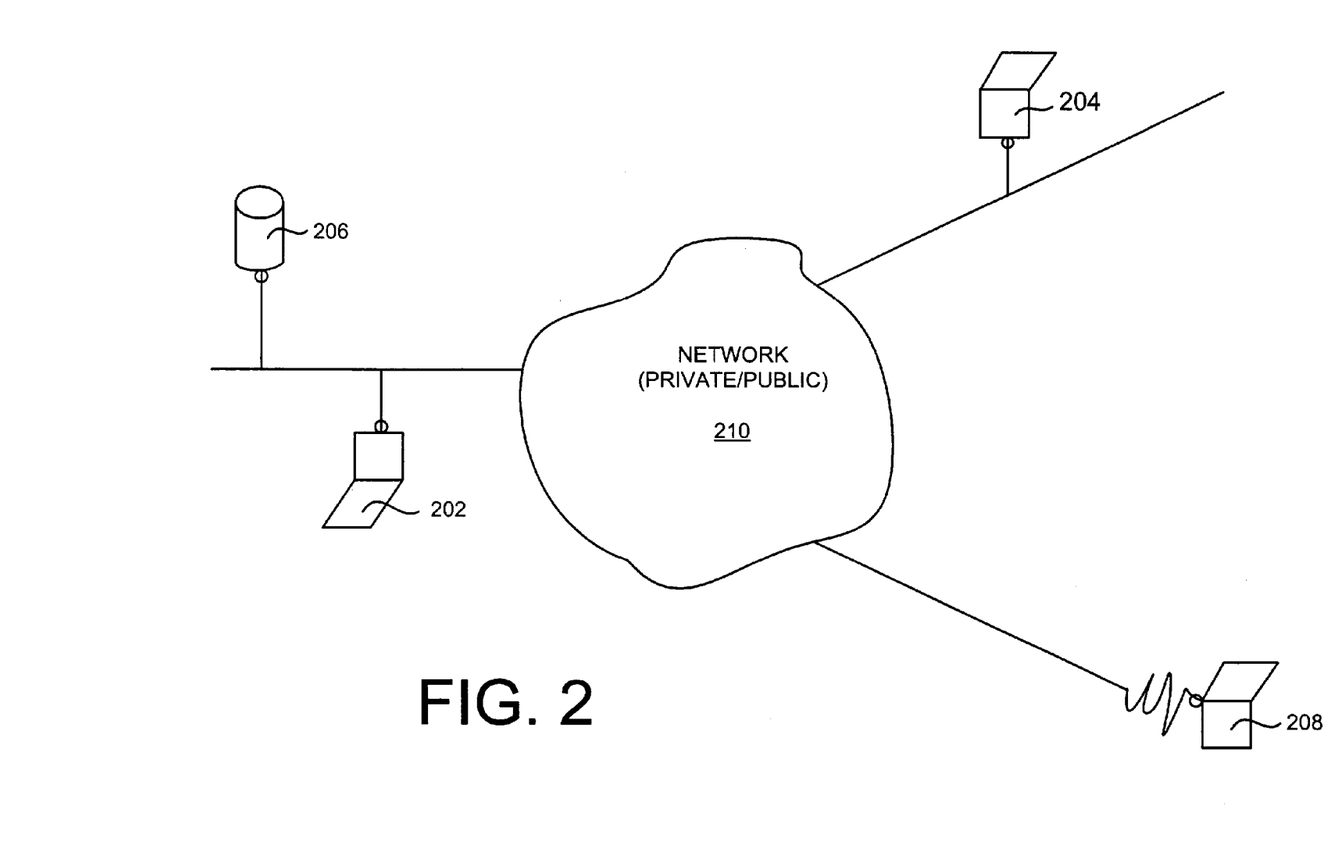
FIG. 2 is a diagram showing one implementation of the host-based security arrangement.

FIG. 2 is a diagram showing one implementation of the host-based security arrangement. Referring to FIG. 2, each of computers 202 and 204, storage device 206, and remote computer 208 is provided with security capabilities to authenticate, perform IP security encapsulation (ESP), and/or encrypt/decrypt confidential data transmitting from or receiving at each of those network nodes. Furthermore, the security implementation at each of these network nodes goes beyond transport layer security (TLS). In contrast with IPSec, which operates primarily at the IP layer, TLS, which operates at the transport layer, is believed to be unsuitable for high speed, low latency networks. Thus, whenever confidential data leaves a network node and touches the network media (irrespective whether private or pubic), that confidential data is rendered secure. The role of the VPN gateway as a security implementing device at the perimeter of the private network is no longer necessary.

However, there are challenges with the host-based security approach. As is well known by those familiar with network security, the tasks involved in the authentication of data communication, encapsulating the packets and encryption/decryption of packets require intensive computation. If left to the host, such security-related tasks quickly overwhelm the computing resources of the host, particularly for data communication at 1 Gbits/second wirespeed and above. Furthermore, it has been found that in networks implementing network-based data storage and more specifically block storage, iSCSI-related tasks, i.e., those tasks involved in encapsulating and decapsulating SCSI commands and data for transport over TCP packets, also require a significant amount of computation resources of the hosts. At a wirespeed of 1 Gbits/second and above, it becomes practically impossible for a typical host device to handle both TCP-related tasks and security-related tasks in a timely manner using the host's own CPU. Accordingly, the inventors herein believe that unless an economical and high-speed device can be created to handle certain TCP-related tasks and certain security-related tasks on behalf of the host device, it would be difficult for applications such as secure network-based data storage to be widely adopted.

In accordance with one aspect of the present invention, there is provided a method and an architecture for offloading the TCP acceleration tasks, for example those related to block storage using the iSCSI protocol, and for offloading host-based security-related tasks. At this point, it may be useful to review some basic concepts in network security.

In one application of the invention, security processing conformant with Internet Protocol Security, or IPSec, is provided. IPSec, in this embodiment, refers to a family of documents and protocols defined by the Internet Engineering Task Force (IETF). The base collection of the definition may be found in, for example, the Request For Comments (RFC) documents, numbers 2401 to 2412 [RFC2401–RFC2412], all of which are incorporated herein by reference. In accordance with, for example, RFC2401, the fundamental components of IP Security architecture includes Security Protocols, Security Associations, Key Management, and algorithms for authentication and/or encryption.

Security Protocols relates to the Authentication Header (AH) and Encapsulating Security Payload (ESP). Security Associations issues include what they are and how they work, how they are managed, and associated processing. Internet Key Management (IKE) may be specified to be either manual and automatic. In the context of the present discussion, IPSec encompasses Security Protocols, Security Associations, and Key Management.

The specific algorithms for authentication and/or encryption may be specified for a particular system. These algorithms are typically created and defined by the National Institute of Standards and Technology (NIST) and documented in Federal Information Processing Standards Publications (FIPS PUBS).

As discussed in RFC2401, there may be two nominal databases involved in security processing: the Security Policy Database and the Security Association Database. The former specifies the policies that determine the disposition of all IP traffic inbound or outbound from a host, security gateway, or BITS or BITW IPsec implementation. The latter database contains parameters that are associated with each (active) security association.

As mentioned, there are major obstacles for achieving line rate processing in TCP/IP Ethernet networks. Security processing, IKE and IPSec, tends to add significant processing above that required for TCP/IP. Producing line-rate capable secure IPSec network is nearly impossible in software. Even with specialized hardware, traditional security policy is problematic and expensive.

In accordance with RFC2401, the SPD must be consulted during the processing of all traffic (INBOUND and OUTBOUND), including non-IPsec traffic. If no policy is found in the SPD that matches the packet (for either inbound or outbound traffic), the packet MUST be discarded.

An examplary entry in an SPD may look like the following:

| | |
|---|---|
| Destination IP Address | * |
| Destination TCP Port Number | 3260 |
| Source IP Address | 10.20.2.5 |
| Soure TCP Port Number | * |
| Protocol | ESP |
| Encryption Algorithm | 3DES-CBC |
| Authentication Algorithm | HMAC-SHA1 |

For VPN gateways, there may be thousands of such entries. Additionally, values may be wildcarded, specified by range, contain specialized IP addressing, etc. The process of determining which policy applies to each individual packet is a challenging problem. The computation required to determine a "match" may include many SPD entry comparisons. Most VPN gateways use specialized hardware to help with this problem. However, the problem is not completely solved as most secure networks, today, run at a fraction of their potential line-rate when IP Security is applied. In short, the problem with security policy is that for high-speed networks requiring security, the current solutions are neither fast nor cheap. They are slow and expensive.

The improved method and architecture is preferably implemented in a single integrated circuit for speed, power consumption, and space-utilization reasons. This is in contrast with prior art approaches to IPSec acceleration, which include employing multiple integrated circuits on multiple adapters, multiple integrated circuits on a single adapter (lookaside), or multiple integrated circuits on a single adapter (in-line). The single integrated circuit approach avoids the inherent design complexity, high expenses, design complexity, and heat generation of the prior art approaches. In combination with the inventive architecture, the single integrated circuit approach facilitates line rate processing in a manner unachievable using prior art approaches to IPSec acceleration.

To offer both speed and flexibility, a combination of hardware-implemented, network processor-implemented, and software-implemented functions are provided. Further, to render the method and architecture scalable to higher line rates (e.g., 10 Gbits/second or above), certain functional blocks, such as the algorithms involved in security encapsulation, encryption/decryption, and authentication are modularly defined and modularly implemented in the integrated circuit to facilitate ready replacement by other appropriate functional blocks as the line rate increases.

Furthermore, the architecture enables the single integrated circuit to offer line-rate IPSec acceleration, TCP acceleration, or both. The integrated circuit preferably handles the offoad of IPSec and TCP independently. In one embodiment, it is recognized that the offload order is important. For example, for secure connections and flows, the IPSec associations are preferably offloaded first, followed by the offload of the TCP connection. Subsequent offload of TCP connections may use an existing IPSec security association.

Similarly, when "unloading" connections, the operations are preferably performed in reverse order. That is, the TCP connection(s) are uploaded, then the IPSec association is uploaded.

In accordance with another embodiment of the present invention, it is recognized that the target environment wherein the security processing is implemented may have more than one form. Exemplary forms include, for example, host systems and other network devices such as switches, routers, and/or gateways. In host systems, it is advantageous to leave the IKE processing into the host and allow the IPSec engine to reside in the integrated circuit. On the other hand, in network equipment, it may not be possible for the equipment to provide the necessary processor for IKE support. For this, the IKE components will reside on the IPSec/TCP offloading IC itself, and more preferably in the Embedded Processor portion of the IPSec/TCP offloading IC. The Embedded Processor and other blocks of the IPSec/TCP offloading IC will be discussed later herein.

To provide the greatest flexibility for supporting various Operating Systems, the OS stack organization, and potential configurations, the inventive architecture includes support for a multi-function device. Generally speaking, operating systems (Windows, Linux, Solaris, HP/UX, etc.) typically have two main paths through hardware adapters, such as PCI devices: the storage stack and the network stack. These stacks tend to operate independently. The proposed multi-function device accommodates both Operating System stacks to access the device simultaneously. Additionally or alternatively, multi-function devices allow for flexible configuration of the IKE and IPSec components, allowing the IKE function to be implemented either onboard or in the host itself when the target environment is host-based.

Furthermore, as the data communication speed increases, the inventors herein also believe that traditional security policy implementations represent a bottleneck to wire-speed security implementations. In order to achieve an economical, wire-speed security implementation at these higher data communication speeds (defined as IGbits/second and above), it is important to bound, in an intelligent manner, certain parameters associated with security association implementations. Otherwise, either the data communication will be slowed or an exotic, expensive high speed computing device will be required to handle security policy implementations in their traditional, unbounded states.

By bounding the security association problem intelligently, little if any functionality is compromised. In exchange, the reduced computational requirement allows the improved method and architecture to be implemented more economically and more scalable to higher line rates. This in turn renders the resultant integrated circuit practical and economical for use in a network where both host-based security and network-based data storage are implemented.

Figure 3:
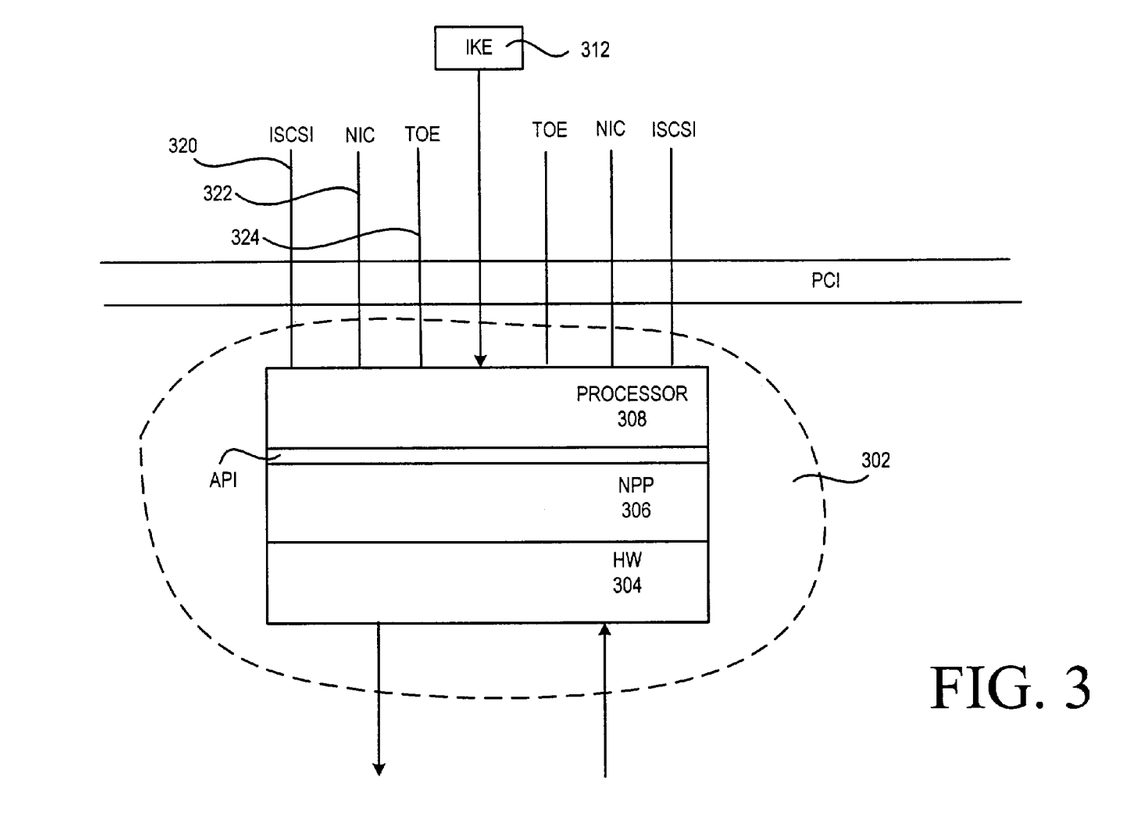
FIG. 3 shows, in accordance with one embodiment of the present invention, an innovative TCP acceleration and security (TAAS) integrated circuit suitable for providing high speed TCP acceleration and data security in a host-based security environment.

The invention may be better understood with reference to the figures and discussions that follow. FIG. 3 shows, in accordance with one embodiment of the present invention, an innovative TCP acceleration and security (TAAS) integrated circuit suitable for providing high speed TCP acceleration and data security in a host-based security environment. The inventive TAAS is especially suitable for providing security for long-lived connections. As the term is employed herein, a long-lived connection is a connection that stays open between two hosts even if no data transfer occurs. An example of a long-lived connection is a connection that is opened when a user's computer wishes to connect with a network-based data storage facility. Even though the user does not transfer data all the time, the connection stays open. In contrast, a temporary connection is one that is closed immediately or shortly after the data transfer burst is finished. Browsers, for example, employ temporary connections to send data in the form of pages from a server to a user's computer.

TAAS 302 includes a hardware circuitry portion (HW) 304, a set of network protocol processors (NPP) 306, and a set of embedded processors (EP) 308. Hardware portion 304 is configured to handle certain high speed TCP acceleration and security-related tasks. NPP 306, on the other hand, offers greater configuration flexibility albeit at a slightly slower speed and is configured to handle a different set of TCP acceleration and security-related tasks. EP 308 offers the greatest flexibility in configuration and programming, albeit at an even slower speed. EP 308 is employed to handle certain TCP acceleration and security-related tasks where flexibility is more important than speed. By dividing the TCP acceleration and security-related tasks among the three main function blocks (i.e., HW 304, NPP 306, and EP 308) of TAAS 302, it is possible to optimize both data transmission speed and configuration flexibility, which ensures that TAAS can be easily upgraded and/or configured to work at different speeds and with different hosts.

Hardware portion 304 includes the gigabit MAC engine (Media Access Controller) circuitry, in addition to the memory (generally RAM or DRAM) needed for temporary data storage and instruction execution. Generally speaking, the hardware portion may include multiple components: one or more encryption hardware devices, one or more authentication hardware devices, and optionally a RSA/DH accelerator. The RSA/DH accelerator is employed to offload the IKE processing in the embedded processor or the host. In one embodiment, the hardware portion is configured to provide security functions for the packets, including 3DES-CBC, which implements data flow encryption, and HMAC-SHA1, which implements authentication. In a single chip design, it may be desirable to limit the number of hardware algorithms due to space, complexity, and power requirement concerns. 3DES-CBC stands for 3-DES Cipher Block Chaining and is a widely known technique for data flow encryption. HMAC-SHA1 implements a widely known hash authentication technique. The details of these security functions are well known to those skilled in the art and will not be discussed in great details here for brevity's sake.

NPP 306 includes iSCSI-related and TCP acceleration functions. These iSCSI-related functions handle packaging SCSI commands and data for transport over TCP. The TCP acceleration functions provided in NPP 306 includes, for example, TCP encapsulation, segmentation, congestion control, guaranteed in-order packet delivery, and the like. With respect to security-related functions, NPP 306 includes IPSec acceleration, security header encapsulation, and security association/security policy database (SA/SPD) lookup.

Security association (SA) includes accessing the IPSec control block and retrieving the appropriate pointers. Security policy database (SPD) lookup may differ for outbound packets and inbound packets. For outbound packets, SPD lookup typically involves retrieving the SPD selectors (such as IP source address, IP destination address, TCP source address, TCP destination address) in order to access the appropriate IPSec protocol control block (IPSec PCB). Based on the information in the IPSec PCB, the packet may be discarded, allowed to pass through, or have some type of security applied to the packet. If the IPSec PCB information indicates that security is warranted, there may be a pointer to the security association (SA) database so that the right security association may be obtained for the outgoing packet.

Inbound packets can be encrypted or unencrypted. For an encrypted inbound packet, the SPI (Security Protocol Index) will be employed to retrieve the IPSec PCB. In one embodiment, the SPI will index to the applicable IPSec PCB. The security policies specified in the applicable IPSec PCB are then analyzed and compared against the inbound packet to ascertain whether to allow the inbound packet to pass, to discard the inbound packet, or to take any other action as may be required by the governing policy. For an unencrypted inbound packet, IP PCB lookup is performed to retrieve the applicable IPSec PCB. As in the encrypted inbound packet case, once the applicable IPSec PCB is retrieved, the security policies specified therein are then analyzed and compared against the inbound packet to ascertain whether to allow the inbound packet to pass, to discard the inbound packet, or to take any other action as may be required by the governing policy.

NPP 306 are essentially "microengines" that are well-suited to network protocol processing. Each of these multiple network processors may include a limited code memory as well as a scratchpad data memory. The NPPs may be pipelined for greater speed. In one embodiment, 2K instructions are provided for each network processor. The advantages offered by a NPP includes the use of optimized instruction sets, full access to other hardware components (????) and cycle efficiency. NPP 306 may be thought of a single network protocol processor, or may be a plurality of network protocol processors (the number of NPPs provided depends on the specific computational load expected, the code size, and the speed desired). As can be appreciated by those skilled in the art, these functions tend to require reconfiguration from time to time, yet still require significantly more speed than can be offered by a general purpose processor. By implementing these functions in micro-code to be executed on NPP 306, the advantage of relatively high speed can be achieved while a high degree flexibility is also realized.

In one embodiment, IP Security processing tasks are preferably handled by the NPPs. For example, tasks such as ESP encapsulation, ESP decapsulation, Security Association (SA) lookup, and integration with the security hardware are preferably handled by the NPPs.

Embedded processor 308 may be similar to a processor found in a typical desktop or laptop computer or a processor suitable for general purpose processing that is not particularly computationally extensive. In the context of the present invention, embedded processor 308 handles any other processing that does not require high speed but is necessary to support TCP acceleration, IPSec, iSCSI offload, and the like. Examples of such processing include the deployment of a discovery protocol, such as Service Location Protocol (SLP) or Storage Name Service (iSNS). EP 308 may also support TCP connection setup and tear down. Further, EP 308 may support Internet Key Exchange (IKE) functions such as certificate handling, lightweight directory access protocols for checking CRLs (Certificate revocation lists), key exchange, and the like. IKE functions include authentication of IKE peers to ascertain that the device at the other end of the communication line is really the device it represents itself to be. Authentication may employ, for example, RSA and/or digital signature standards. IKE functions also include providing security associations and keying material for IPSec layers once authentication is accomplished. While these functions require a high degree of flexibility and reprogrammability, speed is not of the most important concern. By implementing these functions in the form of firmware to execute on the embedded processor (e.g., an ARM processor), a high degree of flexibility is achieved.

Of course the software within the host's processor itself can also be employed to handle certain tasks. In the spectrum of hardware, micro-code, firmware, and software, software executing on the host's processor offers the greatest ease of reprogramming and reconfiguration, at the cost of utilizing the host's precious processing resource.

FIG. 3 also shows an internet key exchange (IKE) block 312. IKE may be implemented aboard TAAS or by the host. In one embodiment, the host may handle most of the IKE functions, with TAAS handling functions such as RSA/DH. TAAS can be configured to function as a multi-function device. To accomplish its multi-function role, data paths 320 and 322 are provided with TAAS 302. iSCSI path 320 represents the path for carrying SCSI commands and data. TOE/NIC path 322 allows TAAS 302 to perform NIC (network interface card) processing as well as to perform TOE (TCP Offload Engine) related tasks in order to accelerate native network processing. By providing different data paths, it is possible for the host to employ different independent drivers and have TAAS perform different tasks simultaneously. Furthermore, most operating systems have a separate network stack and a separate storage stack. By representing the TAAS to the host as a device with separate data paths for separate functions, the storage stack and the network stack may map more naturally to the TAAS.

In one embodiment IKE block 312 is implemented in the host instead of in TAAS 302. In this case, NIC path 322 may be employed to allow the IKE block 312 in the host to authenticate its IKE peer at the other end of the communication path. Once authentication is accomplished, IKE block 312 can provide keying material and security associations. All subsequent data packets can subsequently be sent via iSCSI path 320 in a secure fashion.

One important feature of TAAS 302 is the inline nature of the transmission path for the data packets. The embedded processor is employed to set up IKE for the data flow, including providing keying material and IPSec associations. Subsequently, data packets input into TAAS is processed in a substantially linear, in-line fashion through TCP, IP, IPSec, and MAC blocks, which are implemented in the set of network processors and the hardware portion in the TAAS.

In one embodiment, the API between NPP 306 and embedded processor 308 is defined so as to render it possible to implement the IKE functions in either embedded processor 308 or in the host itself. This is because one of the functions of IKE is to provide IPSec security association and keying materials, which is employed by NPP 306 in order to accomplish its IPSec acceleration functions. The API definition includes notification mechanism to allow the IPSec acceleration block implemented in NPP 306 to inform IKE (implemented in either embedded processor 308 or in the host itself) that it needs a refresh of the IPSec keying materials for a particular communication session. If IKE is implemented in the host, NIC path 322 can be employed for the notification, or iSCSI path 320 may be employed using defined messages.

By defining the API appropriately, the flexibility with regard to which of embedded processor 308 or the host software handles the IKE function is achieved. This is advantageous since there are times when it is more desirable to handle the IKE function in the host (e.g., when the number of security associations is larger than can be handled by embedded processor 308). On the other hand, there are times when it is more desirable to handle the IKE function in embedded processor 308. For example, when the device in which the TAAS is implemented is incapable of providing host functionality, such as the case for certain routers for example, IKE can readily be performed by the embedded processor within the TAAS chip.

Figure 4:
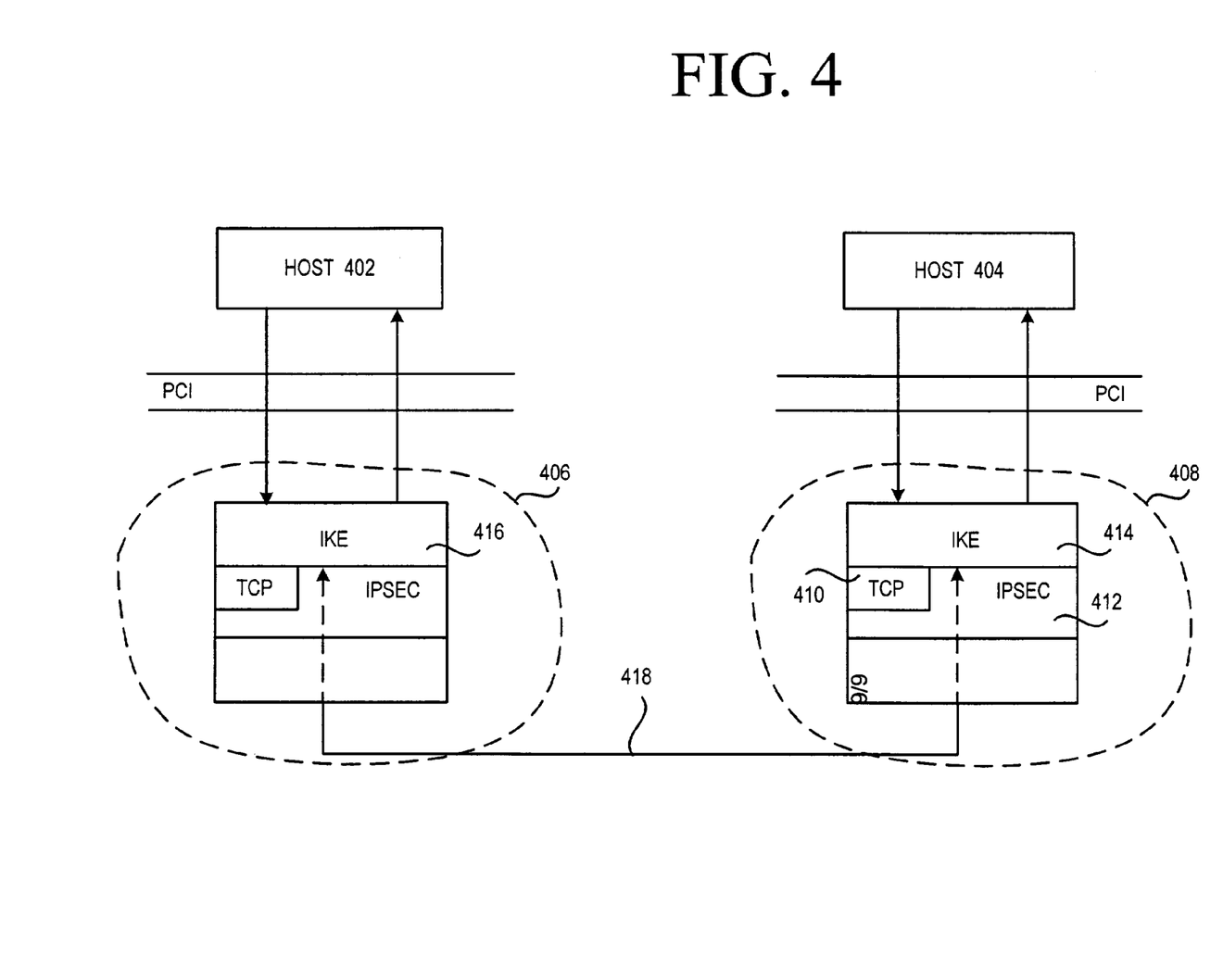
FIG. 4 shows the process for creating an IPSec security association to apply security to packets transmitted between two hosts in accordance with one aspect of the present invention.

FIG. 4 shows the process for creating an IPSec security association to apply security to packets transmitted between two hosts 402 and 404 in accordance with one aspect of the present invention. There are shown two TAAS 406 and 408 coupled to hosts 402 and 404 respectively for offloading TCP acceleration and security-related tasks for long-lived connections between hosts 402 and 404. Upon receiving a connection request, which may originate from the host or from the TAAS chip itself, the security association process begins. With reference to FIG. 4, suppose the operating system within host 404 wishes to establish a TCP connection with one of the logical entities in the network (known as a LUN-logical unit number). The operating system within host 404 may have known the existence of all the logical entities available to it during, for example, start up, when the operating system queries for all logical entities available to it. If the LUN to which the operating system wishes to establish a TCP connection with is a network drive, the connection may be made using the iSCSI protocol via a TCP connection that encapsulates the SCSI commands and data. The connection request may also originate from the TAAS chip itself. For example, the TAAS may itself implement application software which, when executed, would issue a connection request.

The connection request is sent to TCP logic 410, which is responsible for establishing the TCP connection. The packet(s) containing the connection request is sent to IPSec logic 412, which determines that for this new TCP connection request, no security association exists thus far. Consequently, IPSec logic 412 would either reject the packet(s), causing TCP to retry while the security association can be established or IPSec logic 412 can queue the packet(s) while the security association is established.

The security association between two hosts involves at least one ISAKMP (Internet Security Association and Key Management Protocol) association between the two hosts. The ISAKMP security association with the IKE peer happens in the IKE layer. Furthermore, each connection between the two host involves a pair of IPSec associations, which pertain to the association at the IPSec layer. The pair of IPSec security associations include one IPSec security association for inbound traffic and one IPSec security association for outbound traffic. As will be discussed further, the IPSec association is derived from keying materials derived from the ISAKMP association and may be refreshed from time to time to minimize the risk of a security compromise.

When IPSec logic 412 determines that no security association exists, it sends the information pertaining to the connection request to IKE logic 414, which employs the information pertaining to the connection request to establish an ISAKMP security association with its IKE peer 416 within TAAS 406 via network connection 418. ISAKMP security association ensures, among other things, that the target host is who he is supposed to be.

Once an ISAKMP security association is established between the IKE peers 414 and 416, each IKE logic would employ the keying materials from the ISAKMP association to derive the IPSec association (using, for example, 3DES-CBC for the 1 Gbits/sec implementation). The derivation of IPSec security association requires manipulation of the security policy database (which may includes conflicting and/or overlapping policy for a given TCP connection) to determine the appropriate security policy to apply to the requested connection. Since this derivation is computationally intensive and the algorithm itself does not change from connection to connection (although the resultant keying materials does change from connection to connection), the fact that the invention implements the IPSec association derivation algorithm (such as 3DES-CBC) in hardware provides a distinct speed advantage. If a higher bandwidth is required (e.g., for 10 Gbits/sec connections), the 3DES-CBC encryption algorithm may be replaced by a faster, non-serialized encryption algorithm such as Advanced Encryption Standard (AES) counter-mode and HMAC-SHA1 authentication algorithm may be replaced by, for example, AES XCBC-MAC (Advanced Encryption Standard-Xtension CBC-MAC). Information pertaining to AES XCBC-MAC may be found by contacting the IETF (Internet Engineering Task Force), IPSec Working Group (www.ietf.org). AES XCBC-MAC information may also be found in the National Institute of Standards and Technology (NIST) and documented in Federal Information Processing Standards Publications (FIPS PUBS).

Once the pair of IPSec security associations is created for the requested TCP connection, the IPSec security key materials are then applied to the inbound and outbound packets by IPSec logic 414. Of course, if the security policy dictates that the TCP connection have zero security, then there is not need to subsequently apply security to packets pertaining to that TCP connection. More typically, at least some security policy will apply to a TCP connection. From then on, data communication for that TCP connection between hosts 402 and 404 is secured under a host-based security arrangement. Since some algorithms are vulnerable overtime (e.g., 3DES-CBC is vulnerable to the so-called birthday attacks or bit leakage), the IPSec security key materials may be refreshed from time to time to prevent security compromise. The frequency of refresh depends, in part, on the strength of the algorithm, the amount of data that has employed the current IPSec security association, and the like. Refresh involves the derivation of new IPSec security association by the IKE logic using the ISAKMP key materials.

As mentioned earlier, traditional security association techniques require a tremendous amount of computational resource to successfully apply security to the outgoing data packets. In accordance with one aspect of the present invention, the security policy association problem is bounded to render the tasks of implementing security policy association more efficient. To facilitate discussion of this aspect of the present invention, a brief review of security policy association may be helpful. When a packet needs to be sent out, it is important to determine whether security needs to be applied to that outgoing packet and if so, what kind of security policy would apply. Furthermore, it is important to ascertain whether there is an IPSec security association for the packet, and if so, to obtain the IPSec security association for the outgoing packet.

If the security association problem is unbounded, certain performance bottlenecks exist. First, the entire process of determining the appropriate security policy, ascertaining whether there is an IPSec security association, and obtaining the right IPSec security association is computationally expensive. This is because the security association test must be performed (and applied if applicable) to every outgoing packet.

Determining the appropriate security policy for an outgoing packet is challenging since security policies are typically stored in a security policy database and indexed by the source address, destination address, source port number, and/or destination port number. Some policies apply to packets coming from a range of source address, a range of destination address, a range of source port numbers, a range of destination port numbers, or any other criteria. The security policy database also supports wildcard parameters, subnets, ranges, and the like for the values. It is not unusual to lookup in the security policy database the security policy for a particular outgoing packet only to find out that literally hundreds of security policy applies to the outgoing packet due to wildcards, overlapping policies, and the like. Yet, it is important to obtain all applicable policies and ascertain, based on some predefined criteria or algorithm, which security policy should apply. All these tasks of course requires a significant amount of computational resource.

Once the right security policy is ascertained, another search needs to be performed to determine whether there is an IPSec security association. If it is found that there is an IPSec security association, another search through the IPSec security association database is necessary to obtain the IPSec security association for the outgoing packet.

In one aspect of the present invention, it is realized that for certain applications, e.g., end-to end security and/or block storage, one can limit the number of algorithms available to encrypt, to encapsulate and/or to authenticate. Recalling that in the prior art security policy database, many different algorithms for encryption/decryption, for encapsulation and/or for authentication are offered. This is because when security is implemented at a gateway, such as the VPN gateway, all possibilities must be accounted for every time an outgoing packet is encountered.

It is proposed herein that if the security policy implementation can be bounded such that only one encryption/decryption algorithm would apply, only one authentication algorithm would apply, and/or only one encapsulation algorithm would apply. While this may seem unacceptably restrictive, in real life, many applications require only one kind of encryption and/or encapsulation and/or authentication. For example, in the context of end-to-end security, the source and destination pair is well defined. Thus, it is not unduly restrictive to require that IP addresses must specify endpoints and not be ranges, subnets, etc. The TCP ports may well be wildcarded, but great efficiency can be achieved by requiring more specificity in the IP addresses.

In one embodiment, the policy is narrowly and specifically defined such that very little in the way of policy checks are required for either inbound or outbound packet delivery. For example, it may be specified that only ESP, 3DES-CBC, and HMAC-SHA1 IP may be employed for encapsulation, encryption, and authentication respectively in the SPD entries. For the IPSec microengines running in the TAAS chip, the policy is implicit. That is, the existence of the proper linking structures and security associations is enough to determine that there is indeed a policy for the flow, and there may only be one such policy because of the noted restrictions. Thus, if an outgoing packet is found to require security, there is no need to look up the appropriate security policy since the problem is bounded such that all packets requiring security will be encrypted, authenticated, and/or encapsulated using the same set of algorithms.

In one embodiment, even the decision whether to apply security to a given outbound packet is obviated. In this case, all outgoing packets may be viewed as requiring security and since all packets are authenticated and/or encrypted and/or encapsulated the same way, there is no need to search for the corresponding security policy. In another embodiment, the outgoing packets are individually inspected and compared against a database to ascertain whether a particular outgoing packet would require security.

In accordance with one aspect of the present invention, the source address, destination address, source port, and/or destination port associated with outgoing packets are employed directly as indices into an IPSec security association database. In one embodiment, the IPSec security association is bounded such that there is a one-to-one correspondence between a TCP connection and a pair of IPSec security association. Thus, using the source address, destination address, source port, and/or destination port associated with outgoing packets can lead one directly to the required IPSec security associations. In another embodiment, there is allowed a small number of IPSec associations per TCP connection. Thus, a search through the IPSec association database may turn up a handful of IPSec security associations for a given outgoing packet instead of the thousands of IPSec associations that may be found when the security association problem was unbounded. Once the handful of IPSec associations are obtained, any known technique may be employed to pinpoint the exact appropriate IPSec security association for use with the outgoing packet.

By bounding the security policy association problem intelligently, the task of searching for an applicable security policy is eliminated. Additionally or alternatively, the task of determining whether an outgoing packet requires security may even be eliminated. Additionally or alternatively, the bounding of the number of possible IPSec security association per TCP connection results in fewer required calculations to obtain the needed IPSec security association. By simplifying the tasks of obtaining the applicable security policy and the IPSec security association, the invention renders it possible to implement security at wire-speed even for high data rates (e.g., 1 Gbits/sec, 10 Gbits/sec, or higher). The ability to implement security at wire-speed is specially applicable with respect to long-lived connections which do not require frequent IKE processing, e.g., the authentication of IKE peers and the generation of keying material.

Figure 5:
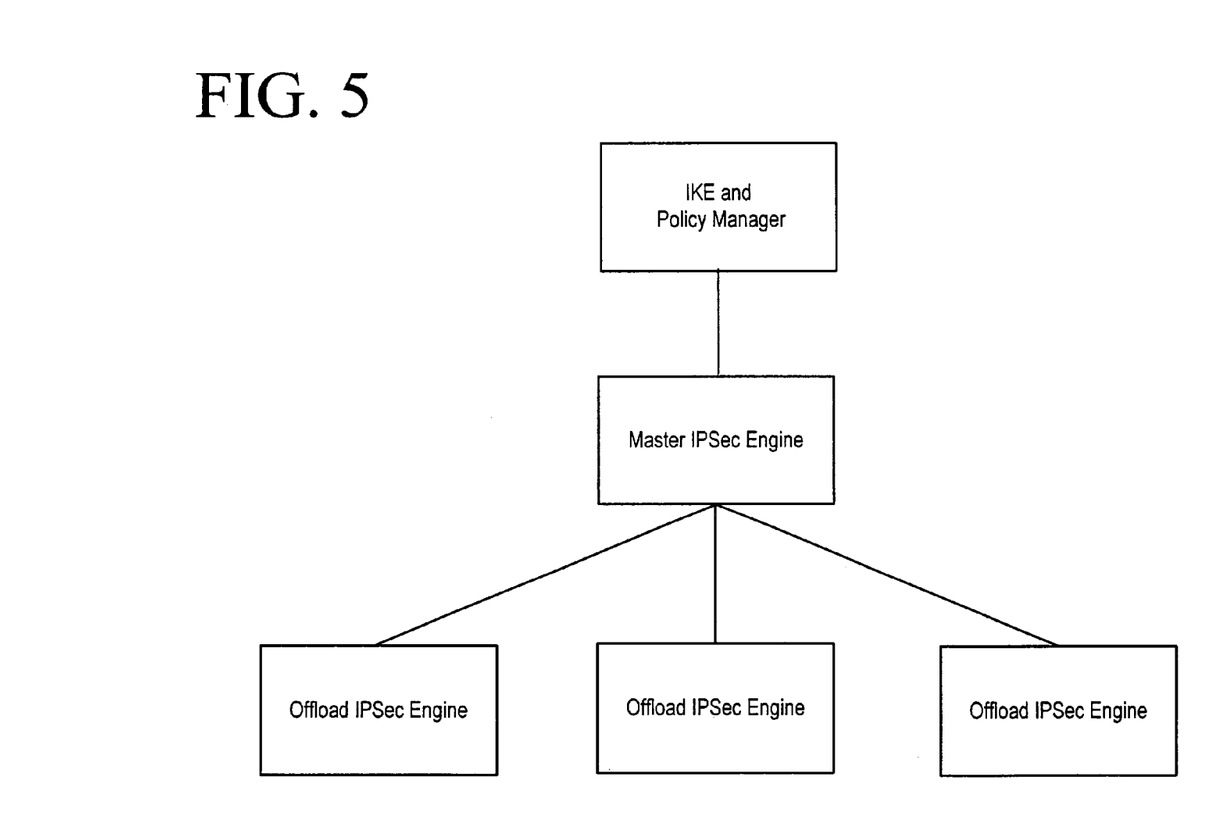
FIG. 5 represents, in accordance with one embodiment of the present invention, a functional block diagram of a system which offloads IP Security processing using a Master IPSec Engine and a plurality of Offload IPSec Engine.

FIG. 5 represents, in accordance with one embodiment of the present invention, a functional block diagram of a system which offloads IP Security processing using a Master IPSec Engine and a plurality of Offload IPSec Engine. The Master IPSec Engine distributes the offload of IPSec security associations, and invokes the IPSec offload capability. Preferably, the Master IPSec Engine handles the initial connection establishment and be located on the same processor as the IKE processing.

Figure 6:
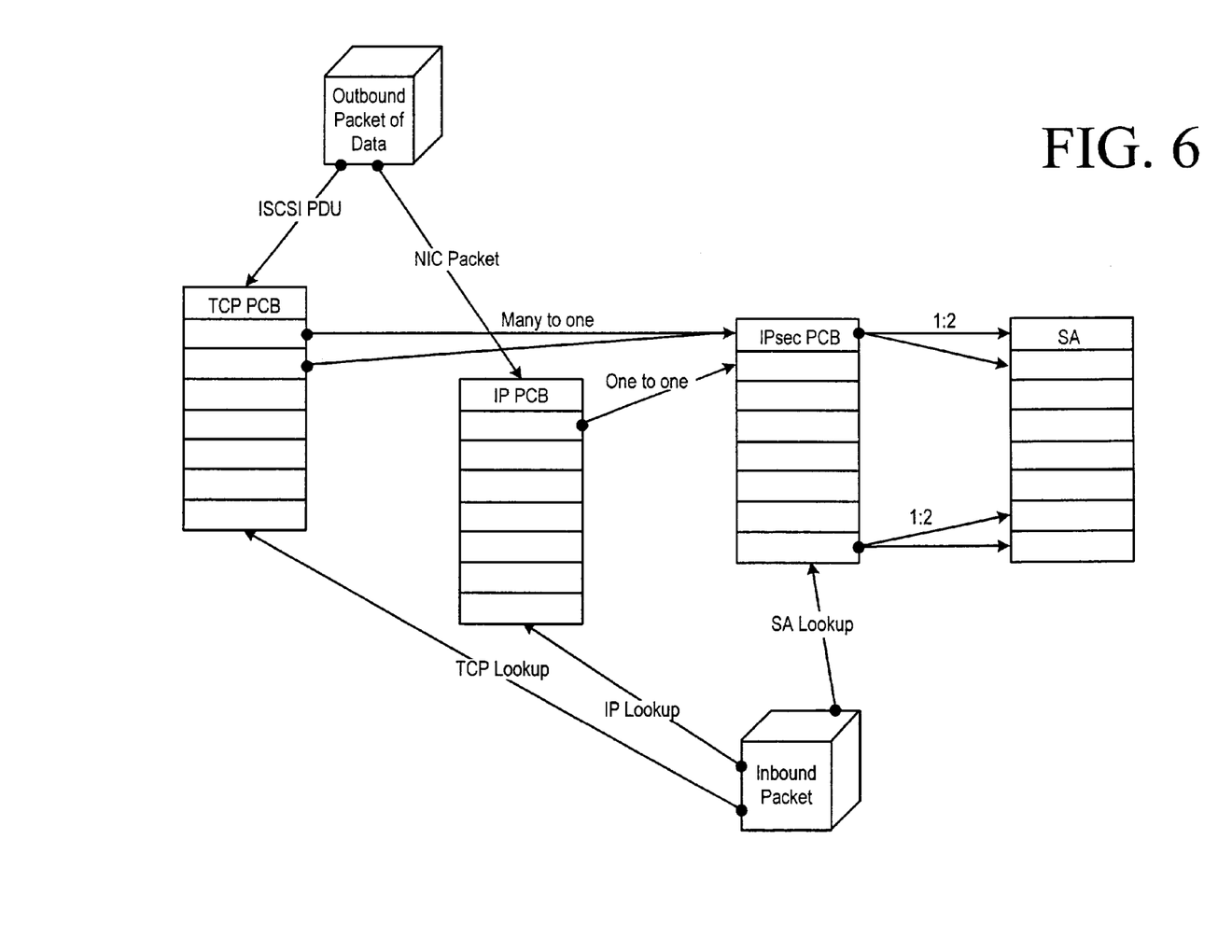
FIG. 6 is a diagram illustrating, in one embodiment, the major functional components and the state they are required to maintain.

In one embodiment, Protocol Control Blocks are employed by the NPPs to maintain security-related information pertaining to the inbound and outbound traffic. FIG. 6 is a diagram illustrating, in one embodiment, the major functional components and the state they are required to maintain. This is "record level" information and the diagram illustrates the relationship of the TCP, IP, IPSec, and SA Control Blocks for both inbound and outbound traffic. As mentioned, the organization and use of PCBs is maintained by the NPPs.

With regarding to connection establishment, when operating in conjunction with TCP offload, the offload order of the IPSec and TCP processing is important. To establish a connection, the following flow of events applies. First, the outbound TCP connection request is intercepted by the Master IPSec Engine. If security is required, then the TCP packet is queued, the Master IPSec Engine hands the request up to IKE for security establishment. A proper Security Association is handed to the Master IPSec engine, and the Security Association is offloaded by the Master IPSec Engine to a particular IPSec Offload Engine. Thereafter, the queued TCP packet is restarted. On the other hand, if no security is required, the packet is allow to pass through. If TCP offload is desired, TCP offloading may occur subsequently.

Offloading IPSec security associations and TCP connections are preferably performed in order. The IPSec offload preferably occurs first, then any subsequent TCP connections may be offloaded. Similarly, when "unloading" connections, the operations are preferably performed in reverse order. The TCP connection(s) are uploaded, then the IPSec association is uploaded.

It is possible to add TCP connections to a Security Association that already exists. With respect to FIG. 6, because there is a many-to-one relationship between TCP PCBs and IPSec PCBs, it is advantageous to maintain a "reverse pointer" where only one-to-one relationships exist. On the inbound path, a TCP PCB lookup is performed where this condition is not met.

In one embodiment, three APIs are employed: the Policy Manager API, the Master Engine API, and the Master/NPP Offload API for IPSec. Preferably, the Policy Manager API and the Master IPSec Engine API operate in pairs (e.g., in the Embedded Processor), and communicate with the NPPs using the Offload API for IPSec.

Thus, while this invention has been described in terms of several preferred embodiments, there are alterations, permutations, and equivalents which fall within the scope of this invention. One should keep in mind that many of the embodiments described herein may be employed in the alternative or may be employed together in a given system. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for providing end-to-end security for communication between a first networked device and a second networked device, comprising:
    providing a first integrated circuit at said first networked device, said first integrated circuit including logic for substantially performing both TCP offloading and IPSec offloading on behalf of said first networked device;
    providing a second integrated circuit at said second networked device, said second integrated circuit including logic for substantially performing both TCP offloading and IPSec offloading on behalf of said second networked device; and
    routing said communication between said first networked device and said second networked device through said first integrated circuit and said second integrated circuit, thereby allowing said first integrated circuit and said second integrated circuit to perform substantial portions of both said TCP offloading and said IPSec offloading on behalf of said first networked device and said second networked device respectively,
    wherein said communication pertains to a long-lived connection between said first networked device and said second networked device, said long-lived connection represents a connection that stays open between said first networked device and said second networked device even if no data transfer occurs and wherein said IPSec offloading comprises IPSec security association, said first integrated circuit performs said IPSec security association on behalf of said first networked device, and wherein said IPSec security association is bounded such that only one encryption/decryption ahgorithm would be required for packets associated with said communication between said first networked device and said second networked device.

2. The method of claim 1 wherein said communication pertains to block storage, wherein one or more data storage blocks in a network data storage device are accessed.

3. The method of claim 1 wherein said IPSec security association is bounded such that only one authentication algorithm would be required for packets associated with said communication between said first networked device and said second networked device.

4. The method of claim 1 wherein said IPSec security association is bounded such that only one encapsulation algorithm would be required for packets associated with said communication between said first networked device and said second networked device.

5. The method of claim 1 wherein said integrated circuit comprises at least one embedded processor, at least one network protocol processor, and hardware logic circuits.

6. The method of claim 5 wherein said network protocol processor is configured to perform a least one of IP Security encapsulation, IP Security decapsulation, and security association lookup on behalf of said first networked device.

7. The method of claim 1 wherein said first integrated circuit performs iSCSI command packaging.

8. The method of claim 1 wherein said first integrated circuit performs TCP encapsulation on behalf of said first network device.

9. The method of claim 1 wherein said first integrated circuit is configured to be capable of handling IKE (Internet Key Management) functions in both a first mode or a second mode, said first mode and said second mode being alternatives, said first mode involving handling said IKE functions within said first integrated circuit, said second mode involving delegating said IKE functions to a host processor of said first networked device, said host processor being external to said first integrated circuit.

10. Integrated circuit for providing end-to-end security for communication from a first networked device to a second networked device, said integrated circuit providing TCP offloading and an IPSec offloading on behalf of said first networked device, comprising:
    a hardware logic portion for performing one of first TCP acceleration tasks and first security tasks;
    a network protocol processor operatively coupled to said hardware logic portion to allow said communication to traverse along an in-line path through said hardware logic portion and said network protocol processor, said network protocol processor performing second TCP acceleration tasks and second security tasks; and
    an embedded processor operatively coupled to said network protocol processor to allow said communication to traverse along an in-line path through said hardware logic portion, said network protocol processor, and said embedded processor, said embedded processor being configured to perform Internet Key Exchange (IKE) functions,
    wherein said communication pertains to a long-lived connection between said first networked device and said second networked device, said long-lived connection represents a connection that stays open between said first networked device and said second networked device even if no data transfer occurs and wherein said IPSec offloading comprises IPSec security association, said first integrated circuit performs said IPSec security association on behalf of said first networked device, and said IPSec security association is bounded such that only one encryption/decryption ahzorithm would be required for packets associated with said communication between said first networked device and said second networked device.

11. The integrated circuit of claim 10 wherein said communication pertains to block storage, wherein one or more data storage blocks in a network data storage device are accessed.

12. The integrated circuit of claim 10 wherein said second security tasks include at least one of IP Security encapsulation, IP Security decapsulation, and security association lookup on behalf of said first networked device.

13. The integrated circuit of claim 10 wherein said TCP offloading includes packaging of iSCSI commands and data.

14. The integrated circuit of claim 10 wherein IKE (Internet Key Management) functions are configured to be handled in a first mode or a second mode by said integrated circuit, said first mode and said second mode being alternatives, said first mode involving handling said IKE functions within said integrated circuit, said second mode involving delegating said IKE functions to a host processor of said first networked device, said host processor being external to said integrated circuit.

* * * * *